US009649785B2

(12) United States Patent
Schmier, II et al.

(10) Patent No.: US 9,649,785 B2
(45) Date of Patent: May 16, 2017

(54) PORTABLE CURING SYSTEM

(75) Inventors: Mark A. Schmier, II, Mesa, AZ (US); Gary Jones, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 1151 days.

(21) Appl. No.: 13/586,032

(22) Filed: Aug. 15, 2012

(65) Prior Publication Data
US 2014/0048966 A1 Feb. 20, 2014

(51) Int. Cl.
| B29C 45/76 | (2006.01) |
| B29C 35/02 | (2006.01) |
| B29C 70/44 | (2006.01) |
| B29C 33/34 | (2006.01) |
| B29C 43/12 | (2006.01) |

(52) U.S. Cl.
CPC .......... B29C 35/0227 (2013.01); B29C 33/34 (2013.01); B29C 70/44 (2013.01); B29C 43/12 (2013.01); *Y02T 50/433* (2013.01)

(58) Field of Classification Search
CPC ...... B29C 35/0227; B29C 33/34; B29C 70/44
USPC ....................................................... 264/40.1
See application file for complete search history.

(56) References Cited

U.S. PATENT DOCUMENTS

| 3,682,571 A * | 8/1972 | Greenberg | .............. B29C 51/10 264/544 |
| 3,689,728 A | 9/1972 | Marini | |
| 5,122,323 A | 6/1992 | Sullivan, Sr. | |
| 5,464,337 A | 11/1995 | Bernardon et al. | |
| 6,207,118 B1 | 3/2001 | Gaven et al. | |
| 2008/0261046 A1* | 10/2008 | Husler | ....................... 428/411.1 |
| 2012/0061006 A1 | 3/2012 | Marquardt | |

FOREIGN PATENT DOCUMENTS

| CN | 1938148 A | 3/2007 | |
| CN | 102325647 A | 1/2012 | |
| EP | 0410599 A2 | 1/1991 | |
| EP | 0709179 A2 | 10/1995 | |
| GB | 2322823 A * | 9/1998 | ............. B29C 33/02 |
| WO | 0054949 A2 | 9/2000 | |

OTHER PUBLICATIONS

"Stetchable Heat Blankets," Heatcon, Inc., May 2004, 1 Page, accessed Aug. 8, 2012, http://www.heatcon.com/press-releases/stretchable-heat-blankets.

(Continued)

*Primary Examiner* — Joseph S Del Sole
*Assistant Examiner* — John Robitaille
(74) *Attorney, Agent, or Firm* — Yee & Associates, P.C.

(57) ABSTRACT

A method and apparatus for curing a composite workpiece to form a part. In one illustrative embodiment, an apparatus may comprise an object, a portable structure, and a heating system. The object may have a shape selected for a part. The portable structure may comprise a retaining structure configured to hold the object. The retaining structure may have a first side and a second side. The heating system may be configured to cover the object at the first side of the retaining structure and the second side of the retaining structure. The heating system may be further configured to generate heat for use in curing a workpiece placed over the object to form the part.

13 Claims, 15 Drawing Sheets

(56) References Cited

OTHER PUBLICATIONS

"HCS7600—Double Vacuum Debulking," Heatcon, Inc., copyright 2012, 2 Pages, accessed Aug. 8, 2012 http://heatcon.com/hcs7600-double-vacuum-debulking-chamber.
"HCS7500-07—Debulking / Curing Table," Heatcon, Inc., copyright 2012, 2 Pages, accessed Aug. 8, 2012 http://heatcon.com/aerospace-rotor-wing/equipment/composite-curing-systems/debulking-curing-tables/hcs7500-07-debulking-curing-table.
"Custom Formed Blankets," Heatcon, Inc., copyright 2012, 2 Pages, accessed Aug. 8, 2012 http://www.heatcon.com/aerospace-rotor-wing/heat-blankets/custom-formed-blankets.
EPO Search Report dated Nov. 22, 2013, regarding Application No. EP13174299, 6 pages.
Canadian Intellectual Property Office Office Action, dated Mar. 21, 2014, regarding Application No. 2,818,638, 3 pages.
State Intellectual Property Office of PRC Notification of First Office Action and English Translation, issued Aug. 3, 2016, regarding Application No. 201310356064.0, 19 pages.

\* cited by examiner

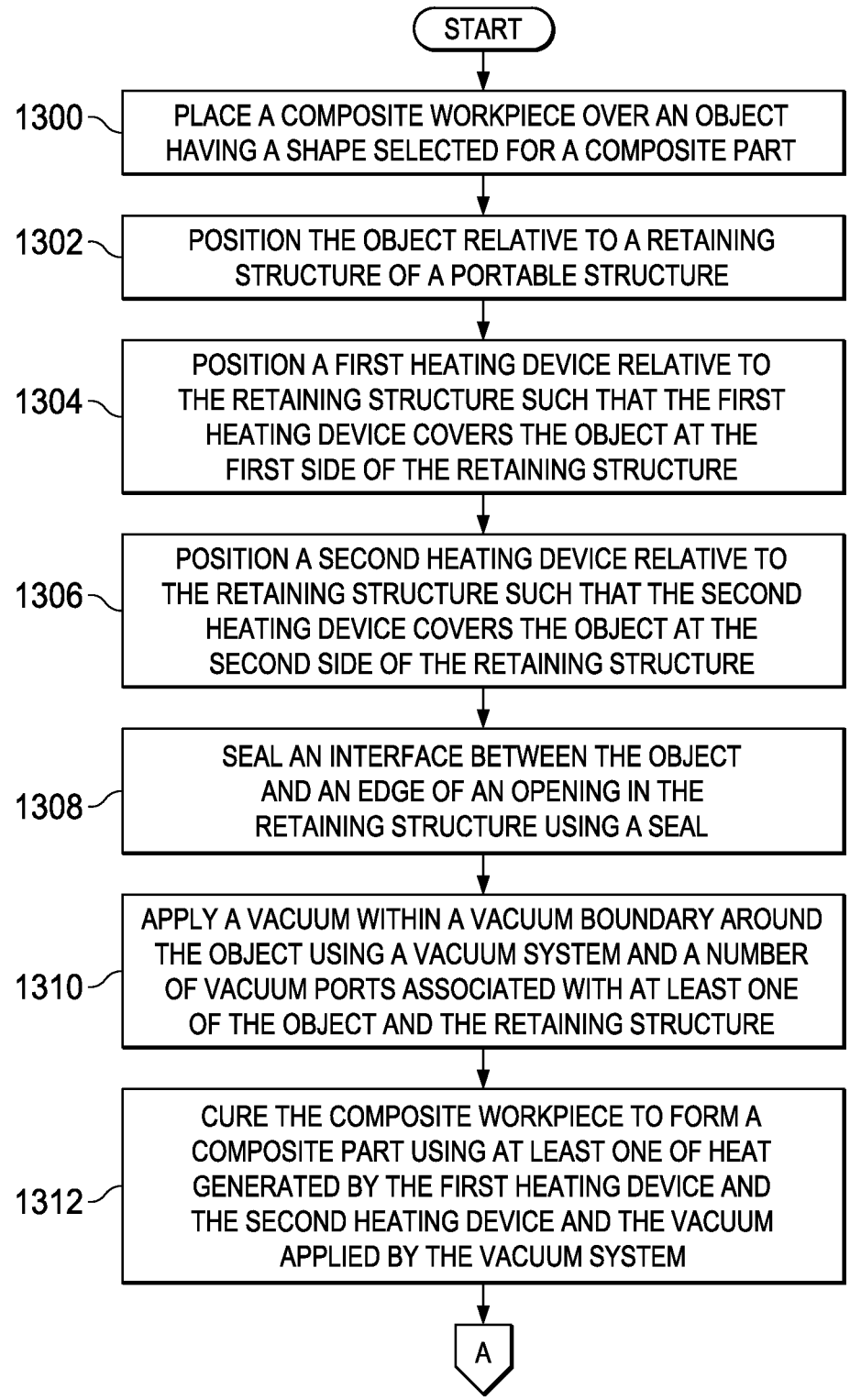

PORTABLE CURING SYSTEM

BACKGROUND INFORMATION

1. Field

The present disclosure relates generally to curing and, in particular, to curing composite materials. Still more particularly, the present disclosure relates to a portable curing system for use in curing composite materials.

2. Background

In some situations, a substance may be hardened or toughened using the process of curing. Typically, the curing process may use heat, pressure, a vacuum, or some combination thereof to cause a chemical reaction in the substance that hardens or toughens the substance. As one illustrative example, heat and/or pressure may be used to cure a composite workpiece to form a composite part. The composite workpiece may comprise any number of composite materials. The composite part may be used in an object such as, for example, without limitation, a vehicle, a piece of equipment, a structural panel, a frame, an aircraft part, an automobile part, a machining tool, a fastener, or some other type of object.

Different types of systems may be used for curing. A curing system may include one or more different types of curing devices. A curing oven and an autoclave may be examples of curing devices that are oftentimes used to cure composite workpieces. A curing oven may generate heat that causes a chemical reaction in a substance placed within the oven once a selected temperature has been reached. An autoclave may use both heat and pressure to cause a chemical reaction in a substance placed within the autoclave.

When manufacturing an object such as, for example, without limitation, an aircraft, different parts for the aircraft may be formed by curing composite workpieces. The manufacturing of these parts may occur in different locations within a manufacturing facility. However, the size and/or weight of some currently available ovens and autoclaves may make moving these devices to the different locations within the manufacturing facility more difficult, time-consuming, and/or expensive than desired. In some cases, moving these devices may be more expensive than purchasing additional devices for use at the different locations.

Additionally, the cost of operating these autoclaves may be greater than desired. For example, without limitation, an autoclave may be used to cure composite workpieces of different sizes. However, the amount of energy needed to reach specified temperatures and specified pressure levels may be greater than desired for smaller composite workpieces. Therefore, it would be desirable to have a method and apparatus that takes into account at least some of the issues discussed above, as well as other possible issues.

SUMMARY

In one illustrative embodiment, an apparatus may comprise an object, a portable structure, and a heating system. The object may have a shape selected for a part. The portable structure may comprise a retaining structure configured to hold the object. The retaining structure may have a first side and a second side. The heating system may be configured to cover the object at the first side of the retaining structure and the second side of the retaining structure. The heating system may be further configured to generate heat for use in curing a workpiece placed over the object to form the part.

In another illustrative embodiment, a portable curing system may comprise an object, a portable structure, a heating system, a number of vacuum ports, a vacuum system, a seal, a sensor system, a control system, and a power system. The object may have a shape selected for a composite part. The portable structure may comprise a retaining structure configured to hold the object. The retaining structure may have a first side, a second side, and an opening configured to receive the object. The heating system may comprise a first heating device and a second heating device. The heating system may be configured to cover the object at the first side of the retaining structure and at the second side of the retaining structure. The heating system may be further configured to generate heat for use in curing a workpiece placed over the object to form the part. The first heating device may be configured to cover the object at the first side of the retaining structure. The second heating device may be configured to cover the object at the second side of the retaining structure. At least one of the first heating device and the second heating device may be comprised of a deformable material configured to allow the at least one of the first heating device and the second heating device to deform in response to a vacuum. The number of vacuum ports may be associated with at least one of the object and the retaining structure. The vacuum system may be connected to the number of vacuum ports. The vacuum system may be configured to apply the vacuum within a vacuum boundary formed around the object by at least one of the heating system and a vacuum bag. The vacuum may be used to cure the workpiece placed over the object to form the part. The seal may be configured to seal an interface between the object and an edge of the opening of the retaining structure. The sensor system may be configured to generate sensor data during curing of the workpiece. The control system may be configured to control vacuum pressure generated by the vacuum system to apply the vacuum and an amount of the heat generated by the heating system based on the sensor data generated by the sensor system. The power system may be configured to supply power to at least one of the heating system, the vacuum system, and the control system.

In yet another illustrative embodiment, a method for curing a workpiece to form a part may be present. The workpiece may be placed over an object having a shape selected for the part. The object may be positioned relative to a retaining structure configured to hold the object. The retaining structure may have a first side and a second side. A heating system may be positioned relative to the retaining structure such that the heating system covers the object at the first side of the retaining structure and at the second side of the retaining structure. The workpiece may be cured to form the part using heat generated by the heating system.

In still yet another illustrative embodiment, a method for curing a composite workpiece to form a composite part may be present. The composite workpiece may be placed over an object having a shape selected for the composite part. The object may be positioned relative to a retaining structure configured to hold the object within an opening in the retaining structure. The retaining structure may have a first side and a second side. A first heating device may be positioned relative to the retaining structure such that the first heating device covers the object at the first side of the retaining structure. A second heating device may be positioned relative to the retaining structure such that the second heating device covers the object at the second side of the retaining structure. An interface between the object and an edge of the opening in the retaining structure may be sealed using a seal. A vacuum may be applied within a vacuum boundary around the object using a vacuum system and a number of vacuum ports associated with at least one of the object and the retaining structure. The composite workpiece may be cured to form the composite part using at least one of heat generated by the first heating device and the second heating device and the vacuum applied by the vacuum system. The composite part may have a final shape that substantially matches at least a portion of the shape of the object. Sensor data may be generated during curing of the workpiece using a sensor system. Vacuum pressure generated by the vacuum system to apply the vacuum and an amount of the heat generated by the first heating device and the second heating device may be controlled based on the sensor data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, without limitation, the illustrative embodiments recognize and take into account that it may be desirable to have a curing system that is portable. In particular, it may be desirable to have a curing system that can be moved to different locations with a desired level of ease and efficiency.

Additionally, the illustrative embodiments recognize and take into account that the cost of operating some currently available curing devices may be greater than desired due to the amount of energy consumed during the operation. The illustrative embodiments recognize and take into account that a curing system that requires less energy to reach specified temperatures and specified pressure levels as compared to some currently available curing devices may reduce the costs associated with curing devices.

Thus, the illustrative embodiments may provide an apparatus and method for curing a composite workpiece to form a composite part. In particular, the illustrative embodiments may provide a portable curing system that is energy efficient.

In one illustrative embodiment, an apparatus may comprise an object, a retaining structure, and a heating system. The object may have a shape selected for a part. The portable structure may comprise a retaining structure configured to hold the object. The retaining structure may have a first side and a second side. The heating system may be configured to cover the object at the first side of the retaining structure and at the second side of the retaining structure. The heating system may be further configured to generate heat for use in curing a workpiece placed over the object to form the part.

Figure 1:
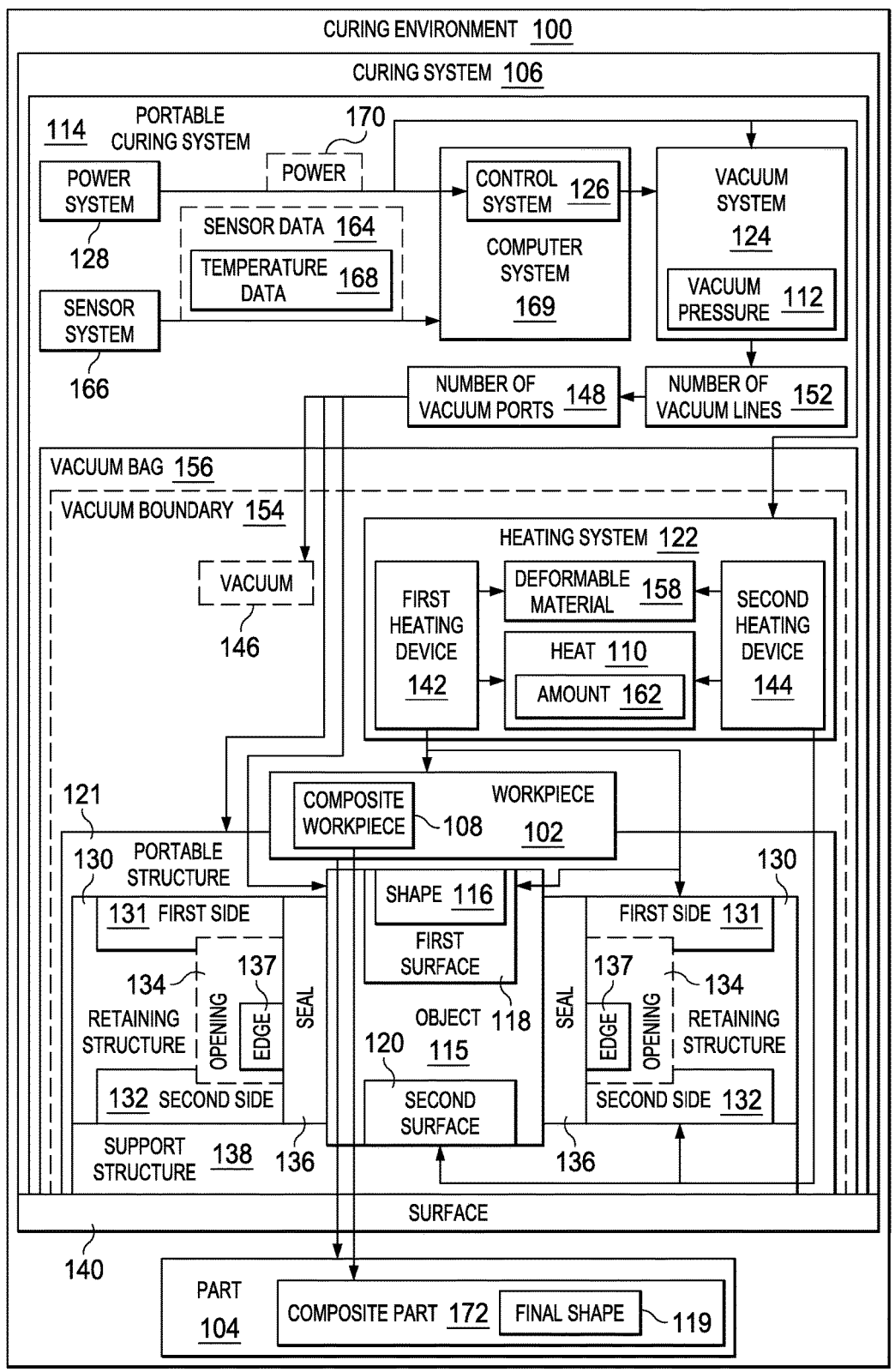
FIG. 1 is an illustration of a curing environment in the form of a block diagram in which an illustrative embodiment may be implemented.

With reference now to the figures and, in particular, with reference to FIG. 1, an illustration of a curing environment in the form of a block diagram is depicted in accordance with an illustrative embodiment. In FIG. 1, curing environment 100 may be an example of an environment in which workpiece 102 may be cured to form part 104. In particular, curing system 106 may be used to cure workpiece 102 to form part 104.

In these illustrative examples, workpiece 102 may take the form of composite workpiece 108. Composite workpiece 108 may be comprised of any number of composite materials. These composite materials may include, for example, without limitation, at least one of a fiber reinforced polymer (FRP), a carbon-fiber reinforced plastic (CFRP), a thermoplastic, and some other suitable type of composite material. In some cases, composite workpiece 108 may comprise at least one other type of material in addition to the one or more composite materials that form composite workpiece 108.

As used herein, the phrase "at least one of", when used with a list of items, means different combinations of one or more of the listed items may be used and only one of each item in the list may be needed. For example, without limitation, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other suitable combination.

In these illustrative examples, curing system 106 may be configured to use heat 110 and vacuum pressure 112 to cure composite workpiece 108. In other illustrative examples, some other type of pressure may be used to cure composite workpiece 108 in addition to and/or in place of vacuum pressure 112. Further, in these examples, curing system 106 may be portable curing system 114. Portable curing system 114 may be moved to different locations with a desired level of ease and without requiring more time and/or expense than desired.

Composite workpiece 108 may be placed over object 115 such that composite workpiece 108 substantially conforms to shape 116 of object 115. In particular, object 115 may have first surface 118 and second surface 120. Shape 116 may be the shape of first surface 118 of object 115 in these illustrative examples.

Shape 116 may be selected based on final shape 119 desired for part 104. Final shape 119 may be formed by at least a portion of shape 116. For example, without limitation, when shape 116 is a cuboidal shape, final shape 119 may be only a top half portion of the cuboidal shape. In some illustrative examples, object 115 may be referred to as a tool or a mandrel.

Composite workpiece 108 may be placed over first surface 118 of object 115 such that composite workpiece 108 substantially conforms to shape 116 of object 115. Thereafter, portable curing system 114 may be used to cure composite workpiece 108 on object 115 such that composite workpiece 108 hardens having final shape 119 to form part 104.

As depicted, portable curing system 114 may include portable structure 121, heating system 122, vacuum system 124, control system 126, and power system 128. Portable structure 121 may comprise retaining structure 130. Retaining structure 130 may be configured to hold object 115 in place.

Retaining structure 130 may have first side 131 and second side 132. In some illustrative examples, first side 131 of retaining structure 130 may be a top side or top surface of retaining structure 130, while second side 132 may be a bottom side or bottom surface of retaining structure 130.

In one illustrative example, retaining structure 130 may have opening 134 that extends from first side 131 to second side 132. In particular, retaining structure 130 may be configured to receive object 115 into opening 134. Further, retaining structure 130 may hold object 115 within opening 134 such that first surface 118 of object 115 is exposed at first side 131 of retaining structure 130 and second surface 120 of object 115 is exposed at second side 132 of retaining structure 130.

In some cases, seal 136 may be used to seal the interface between retaining structure 130 and object 115. In particular, seal 136 may be used to seal edge 137 of opening 134 in retaining structure 130 such that fluids, including air and/or other types of gases, are not allowed to pass through opening 134 once object 115 is held in place by retaining structure 130. Seal 136 may take a number of different forms and comprise any number of components. For example, without limitation, seal 136 may be a gasket.

As depicted, portable structure 121 may also include support structure 138 in some illustrative examples. Support structure 138 may be configured to support retaining structure 130 such that retaining structure 130 is held at some distance from surface 140 on which portable curing system 114 is being used. Surface 140 may be, for example, without limitation, a table surface, a floor, a platform surface, or some other type of surface.

Heating system 122 may be configured to generate heat 110 for use in curing composite workpiece 108. Heating system 122 may be configured to surround object 115. In particular, heating system 122 may be configured to cover object 115 at first side 131 of retaining structure 130 and second side 132 of retaining structure 130. As one illustrative example, heating system 122 may comprise first heating device 142 and second heating device 144.

First heating device 142 may be positioned relative to first surface 118 of object 115 with composite workpiece 108 on first surface 118. In this manner, first heating device 142 may cover object 115 at first side 131 of retaining structure 130. More specifically, first heating device 142 may cover composite workpiece 108 lying on first surface 118 of object 115. Further, second heating device 144 may be positioned relative to second surface 120 of object 115 such that second heating device 144 covers second surface 120 of object 115 at second side 132 of retaining structure 130.

First heating device 142 and second heating device 144 may be configured to generate heat 110 to increase the temperature of object 115 and composite workpiece 108 on object 115. The temperature of object 115 and composite workpiece 108 may be increased to a temperature specified for the curing of composite workpiece 108.

Additionally, vacuum system 124 may be configured to apply vacuum 146 for use in curing composite workpiece 108. In one illustrative example, number of vacuum ports 148 may be associated with at least one of object 115 and portable structure 121. Vacuum system 124 may connect to number of vacuum ports 148 using number of vacuum lines 152.

As used herein, when one component is "associated" with another component, this association is a physical association in the depicted examples. For example, without limitation, a first component, such as one of number of vacuum ports 148, may be considered to be associated with a second component, such as portable structure 121, by being secured to the second component, bonded to the second component, mounted to the second component, welded to the second component, fastened to the second component, and/or connected to the second component in some other suitable manner.

Additionally, the first component also may be connected to the second component using a third component. The first component may also be considered to be associated with the second component by being formed as part of and/or as an extension of the second component.

In this illustrative example, vacuum system 124 may apply vacuum 146 within vacuum boundary 154 around object 115. Vacuum boundary 154 may be formed by at least one of heating system 122, vacuum bag 156, and some other suitable type of structure and/or material. For example, without limitation, vacuum bag 156 may be placed around portable structure 121 and around heating system 122. Vacuum bag 156 may be substantially hermetic in this example.

Vacuum system 124 may remove gas molecules from the space within vacuum boundary 154 through number of vacuum lines 152 connected to number of vacuum ports 148. Removing gas molecules from this space may apply vacuum 146 within vacuum boundary 154. Vacuum 146 may aid in the curing of composite workpiece 108. In some cases, vacuum 146 may reduce the porosity of part 104 formed by the curing process.

Additionally, in some cases, at least one of first heating device 142 and second heating device 144 may be configured to deform in response to vacuum 146. For example, without limitation, at least one of first heating device 142 and second heating device 144 may be comprised of deformable material 158. Deformable material 158 may be selected such that first heating device 142 and/or second heating device 144 may deform in response to vacuum 146 generated by vacuum system 124.

For example, without limitation, when first heating device 142 is comprised of deformable material 158, first heating device 142 may deform to substantially conform to shape 116 of object 115 in response to vacuum 146 being applied. In this manner, heat 110 generated by first heating device 142 may be more directly applied to first surface 118 of object 115 during curing. This type of application of heat 110 may reduce the amount of energy consumed to reach the temperatures specified for the curing of composite workpiece 108.

In these illustrative examples, control system 126 may be configured to control at least one of heating system 122 and vacuum system 124. In particular, control system 126 may control vacuum pressure 112 generated by vacuum system 124 to apply vacuum 146 and amount 162 of heat 110 generated by heating system 122.

In one illustrative example, control system 126 may use sensor data 164 generated by sensor system 166 to control heating system 122 and/or vacuum system 124. Sensor system 166 may comprise any number of sensors, such as, for example, without limitation, temperature sensors, pressure sensors, and other types of sensors. Sensor system 166 may monitor at least one of the temperatures of the different components within portable curing system 114 and the vacuum pressure within vacuum boundary 154 during the curing of composite workpiece 108.

As one illustrative example, sensor system 166 may comprise one or more thermocouples. These thermocouples may be attached to at least one of object 115, heating system 122, composite workpiece 108, or some other component of portable curing system 114. These thermocouples may be used to generate sensor data 164 in the form of temperature data 168. Control system 126 may use this temperature data 168 to adjust amount 162 of heat 110 generated by first heating device 142 and/or second heating device 144 in heating system 122 during the curing of composite workpiece 108.

Control system 126 may be implemented in, for example, without limitation, computer system 169 comprising one or more computers. In some cases, control system 126 may be implemented in, for example, without limitation, a laptop, a processor unit, a personal digital assistant (PDA), or some other type of computer hardware. Control system 126 may have a size and weight configured such that control system 126 is portable.

Power system 128 may be configured to supply power 170 to at least one of heating system 122, vacuum system 124, and control system 126. Power system 128 may comprise any number of power sources. For example, without limitation, power system 128 may include a power generator, a battery system, a motor, and/or other types of power devices.

In this manner, portable curing system 114 may be used to cure composite workpiece 108 to form part 104. In particular, part 104 may be referred to as composite part 172. Composite part 172 may have final shape 119. With this type of portable curing system, different types of objects may be used to form parts having different shapes. In this manner, portable curing system 114, in addition to being portable, may be adaptable such that different types of parts may be formed using portable curing system 114.

The illustration of curing environment in FIG. 1 is not meant to imply physical or architectural limitations to the manner in which an illustrative embodiment may be implemented. Other components in addition to or in place of the ones illustrated may be used. Some components may be optional. Also, the blocks may be presented to illustrate some functional components. One or more of these blocks may be combined, divided, or combined and divided into different blocks when implemented in an illustrative embodiment.

In some illustrative examples, second surface 120 of object 115 may not be left exposed. In other illustrative examples, other components in addition to and/or in place of the ones described above may be included in portable curing system 114. In some cases, support structure 138 may be optional for portable structure 121.

In still other illustrative examples, a first breather material (not shown) and a second breather material (not shown) may be used. The first breather material (not shown) may be positioned between first heating device 142 and retaining structure 130. In this manner, the first breather material (not shown) may cover composite workpiece 108 lying on first surface 118 of object 115 at first side 131 of retaining structure 130, while first heating device 142 may cover the first breather material (not shown).

Additionally, the second breather material (not shown) may be positioned between second heating device 144 and retaining structure 130. In this manner, the second breather material (not shown) may cover second surface 120 of object 115 at second side 132 of retaining structure 130.

The first breather material (not shown) and the second breather material (not shown) may be used to help apply vacuum 146 within vacuum boundary 154. In particular, these breather materials (not shown) may be comprised of materials such as, for example, without limitation, wool, cotton, or some other type of fabric configured to allow air to move through the breather materials.

Figure 2:
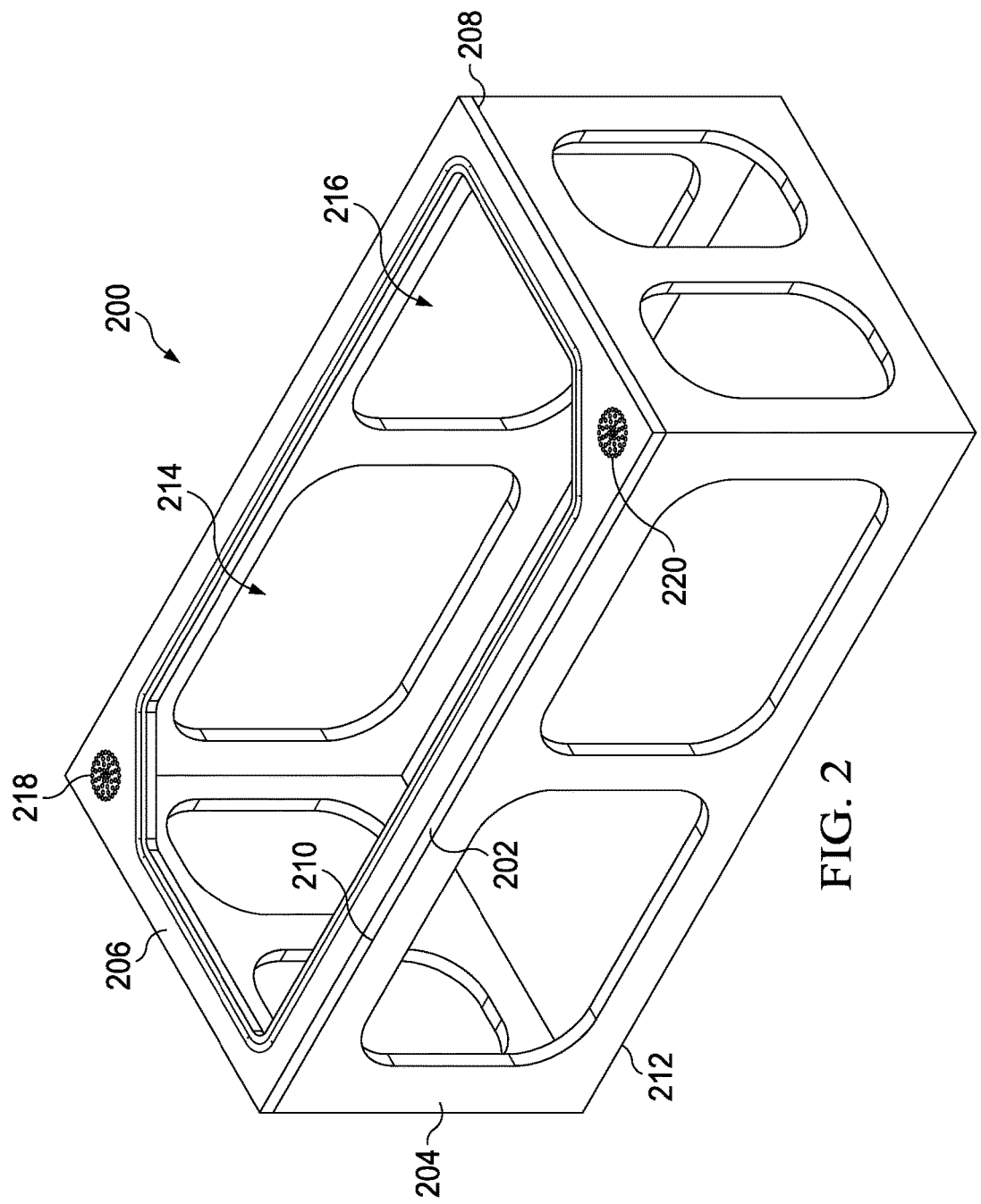
FIG. 2 is an illustration of a top isometric view of a portable structure in accordance with an illustrative embodiment.

With reference now to FIG. 2, an illustration of a top isometric view of a portable structure is depicted in accordance with an illustrative embodiment. In FIG. 2, portable structure 200 may be an example of one implementation for portable structure 121 in FIG. 1. As depicted, portable structure 200 may include retaining structure 202 and support structure 204. Retaining structure 202 and support structure 204 may be examples of implementations for retaining structure 130 and support structure 138, respectively, in FIG. 1.

In this illustrative example, support structure 204 may support retaining structure 202. In particular, retaining structure 202 may have first side 206 and second side 208. In this illustrative example, first side 206 may be a top side of retaining structure 202, while second side 208 may be a bottom side of retaining structure 202.

Further, support structure 204 may have first side 210 and second side 212. In this illustrative example, first side 210 may be a top side of support structure 204, while second side 212 may be a bottom side of support structure 204. As depicted, retaining structure 202 may be attached to first side 210 of support structure 204.

Further, retaining structure 202 may have opening 214. Opening 214 may be configured to receive an object, such as, for example, without limitation, object 115 in FIG. 1. Additionally, support structure 204 may have access openings 216. Access openings 216 may be configured to provide an operator with access to opening 214 of retaining structure 202 at second side 208 of retaining structure 202.

As depicted, vacuum attachment point 218 and vacuum attachment point 220 may be attachment points for vacuum ports (not shown) on retaining structure 202 of portable structure 200. In particular, vacuum attachment point 218 and vacuum attachment point 220 may be located on first side 206 of retaining structure 202.

Figure 3:
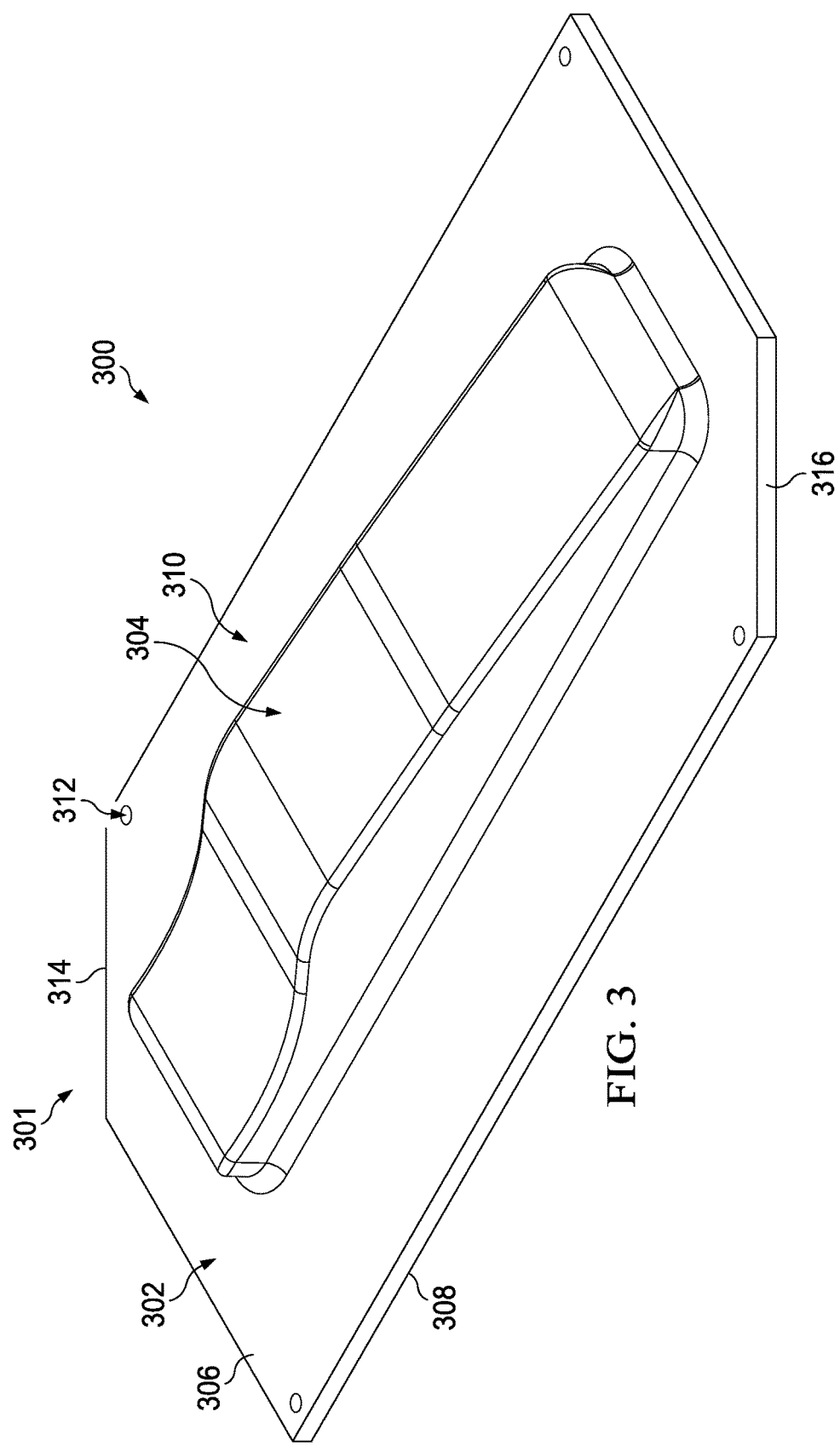
FIG. 3 is an illustration of a top isometric view of a mandrel in accordance with an illustrative embodiment.

Turning now to FIG. 3, an illustration of a top isometric view of a mandrel is depicted in accordance with an illustrative embodiment. In FIG. 3, object 300 may be an example of one implementation for object 115 in FIG. 1. In this illustrative example, object 300 may take the form of mandrel 301. In particular, mandrel 301 may be considered a male mandrel.

As depicted, mandrel 301 may have first portion 302 and second portion 304. Second portion 304 may be the portion of mandrel 301 used for shaping a workpiece (not shown) during curing. Further, mandrel 301 may have first surface 306 and second surface 308. First surface 306 may have shape 310. In particular, shape 310 may be the shape of first surface 306 of second portion 304 of mandrel 301. Shape 310 may be an example of one implementation for shape 116 in FIG. 1.

In this illustrative example, mandrel 301 may have plurality of holes 312. These holes may be used to attach mandrel 301 to retaining structure 202 of portable structure 200 in FIG. 2. In particular, fasteners (not shown) may be inserted into plurality of holes 312 to attach mandrel 301 to first side 206 of retaining structure 202 of portable structure 200 in FIG. 2.

As depicted, mandrel 301 may have cut corner 314 and cut corner 316. Cut corner 314 and cut corner 316 may be configured such that vacuum attachment point 218 and vacuum attachment point 220 on retaining structure 202 in FIG. 2 may remain exposed when mandrel 301 is attached to retaining structure 202.

Figure 4:
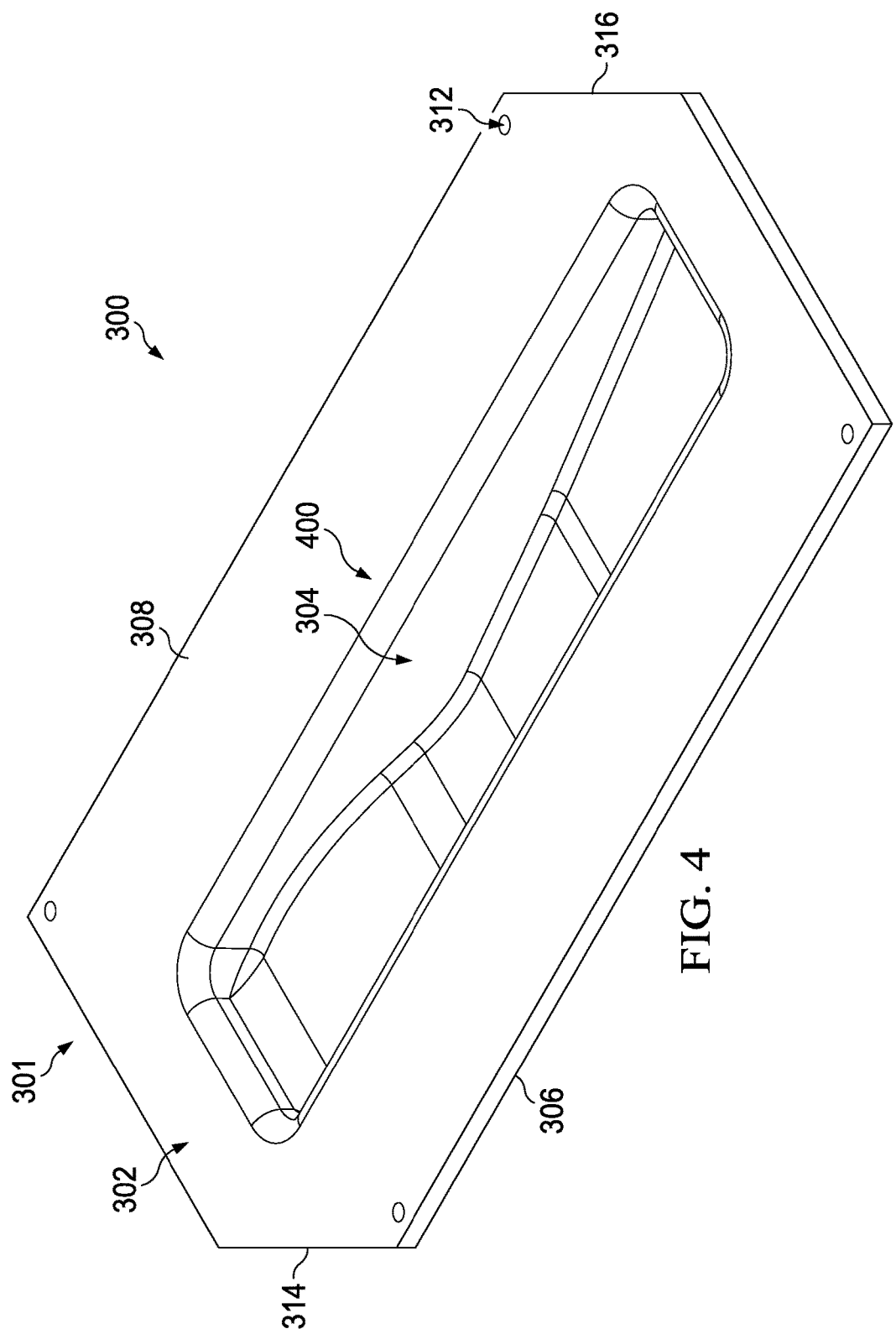
FIG. 4 is an illustration of a bottom isometric view of a mandrel in accordance with an illustrative embodiment.

With reference now to FIG. 4, an illustration of a bottom isometric view of mandrel 301 from FIG. 3 is depicted in accordance with an illustrative embodiment. As depicted in FIG. 4, shape 310 of first surface 306 of second portion 304 of mandrel 301 may form cavity 400 with respect to second surface 308 of mandrel 301.

Figure 5:
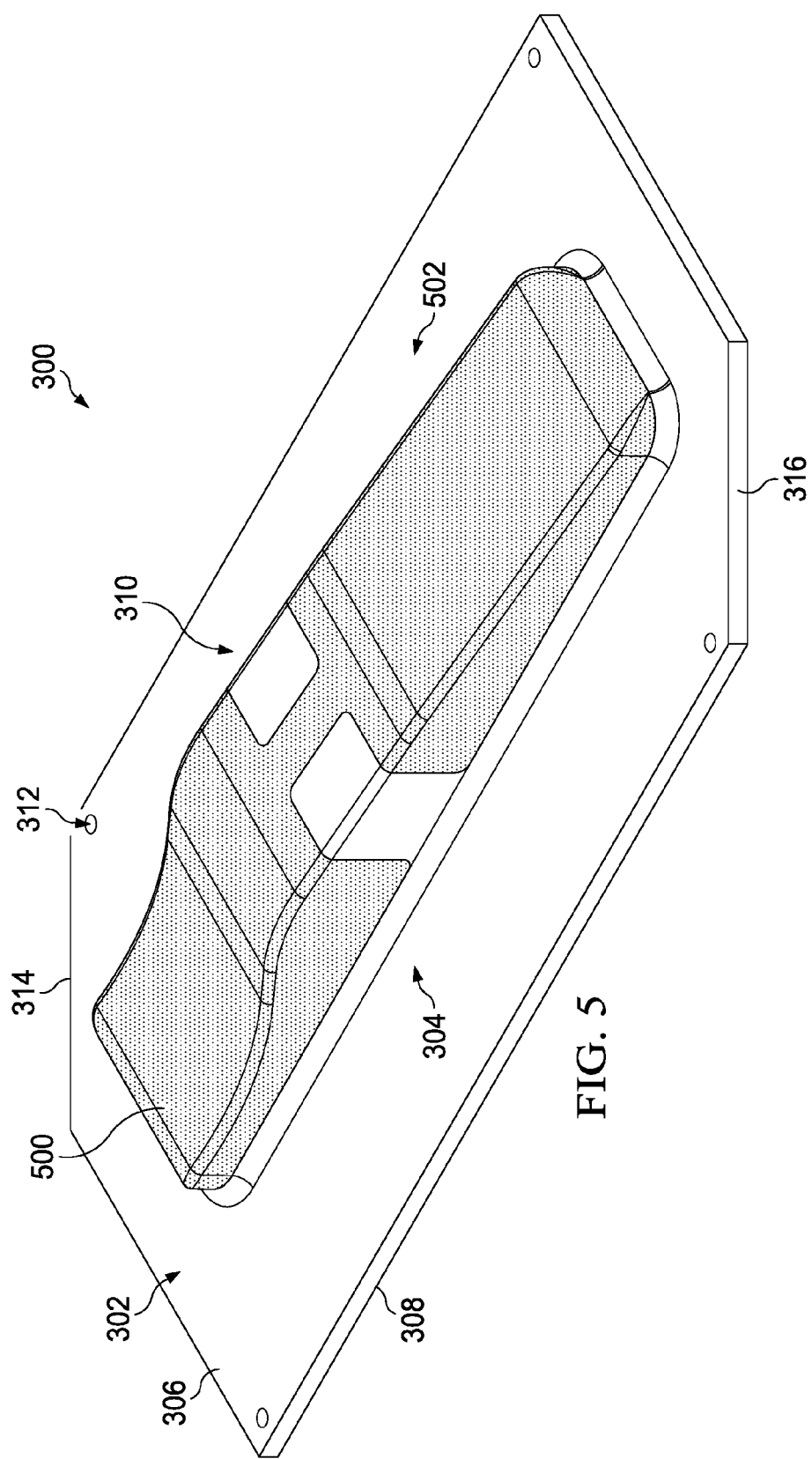
FIG. 5 is an illustration of a top isometric view of a composite workpiece laid over a mandrel in accordance with an illustrative embodiment.

Turning now to FIG. 5, an illustration of a top isometric view of a composite workpiece laid over mandrel 301 from FIG. 3 is depicted in accordance with an illustrative embodiment. In FIG. 5, composite workpiece 500 may be placed over mandrel 301. Composite workpiece 500 may be an example of one implementation for composite workpiece 108 in FIG. 1.

As depicted, composite workpiece 500 may be placed over first surface 306 of second portion 304 of mandrel 301 such that composite workpiece 500 substantially conforms to shape 310. In this illustrative example, composite workpiece 500 may cover only a portion of shape 310 of mandrel 301. Consequently, final shape 502 of composite workpiece 500 may be formed by only a portion of shape 310 of mandrel 301. Final shape 502 may be the final shape for the composite part to be formed by curing composite workpiece 500.

Figure 6:
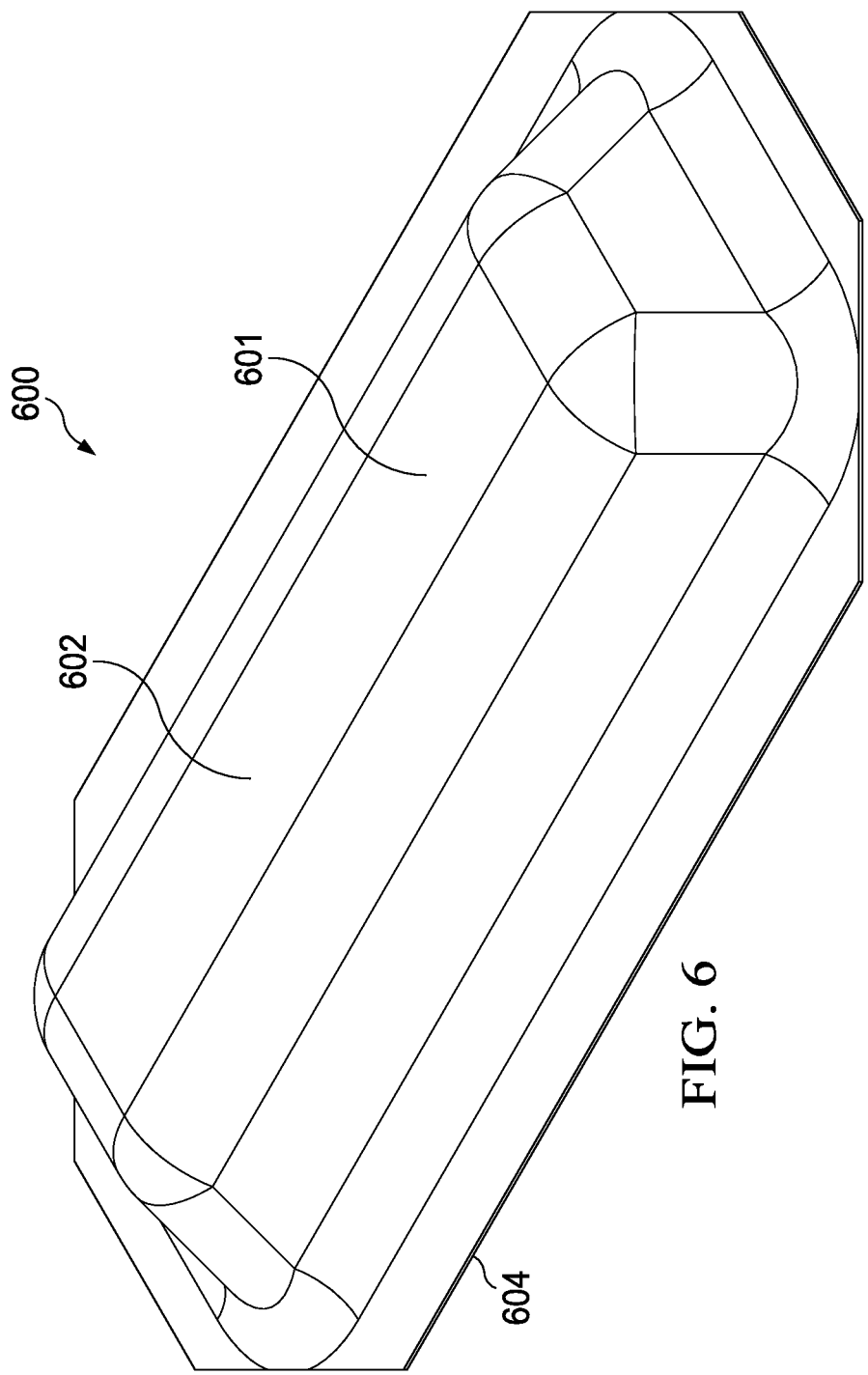
FIG. 6 is an illustration of a top isometric view of a thermal blanket in accordance with an illustrative embodiment.

With reference now to FIG. 6, an illustration of a top isometric view of a thermal blanket is depicted in accordance with an illustrative embodiment. In FIG. 6, heating device 600 may be an example of one implementation for first heating device 142 in FIG. 1. In this illustrative example, heating device 600 may take the form of thermal blanket 601. As depicted, thermal blanket 601 may have first side 602 and second side 604.

Figure 7:
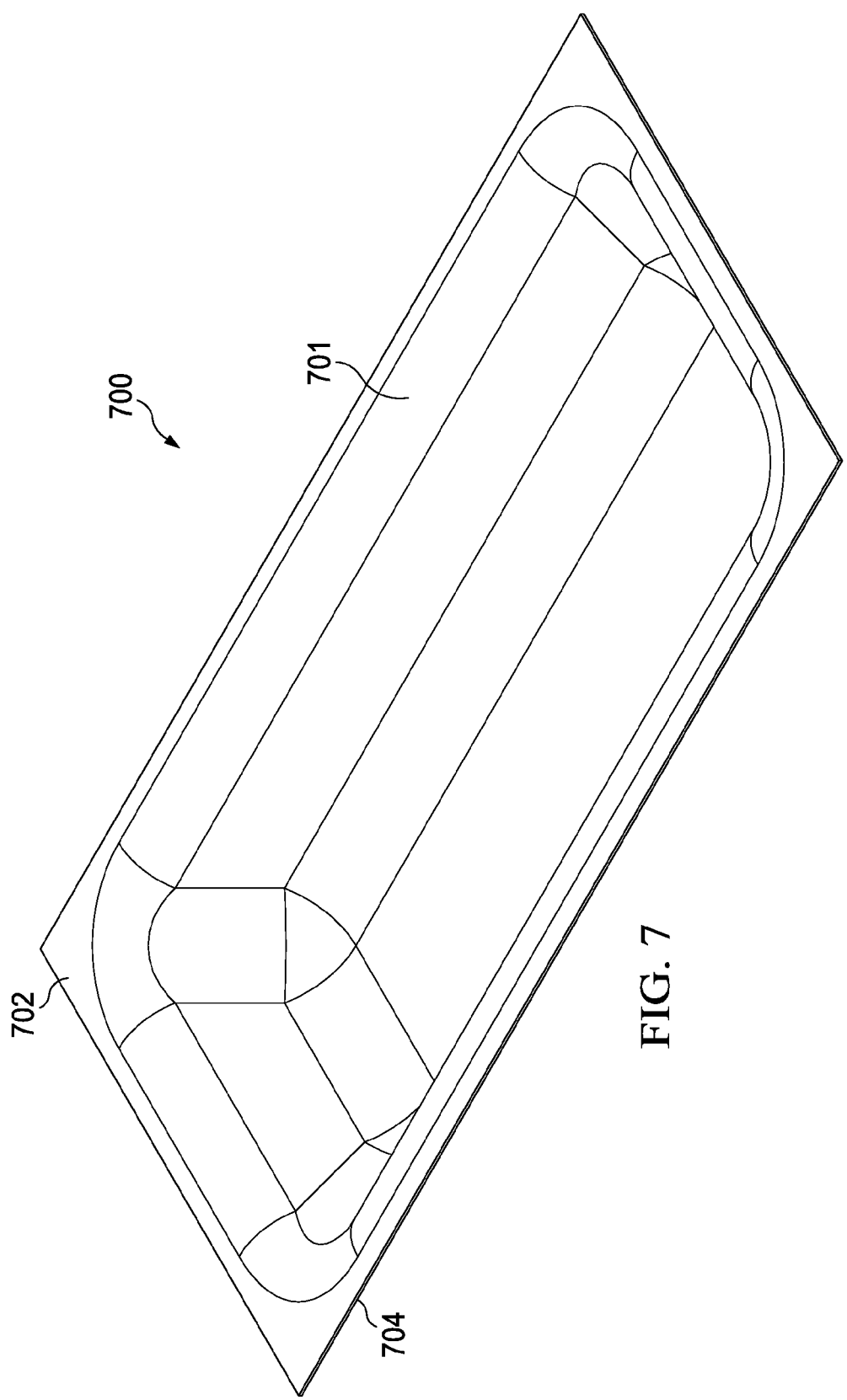
FIG. 7 is an illustration of a top isomeric view of a thermal bladder in accordance with an illustrative embodiment.

With reference now to FIG. 7, an illustration of a top isomeric view of a thermal bladder is depicted in accordance with an illustrative embodiment. In FIG. 7, heating device 700 may be an example of one implementation for second heating device 144 in FIG. 1. In this illustrative example, heating device 700 may take the form of thermal bladder 701. As depicted, thermal bladder 701 may have first side 702 and second side 704.

Figure 8:
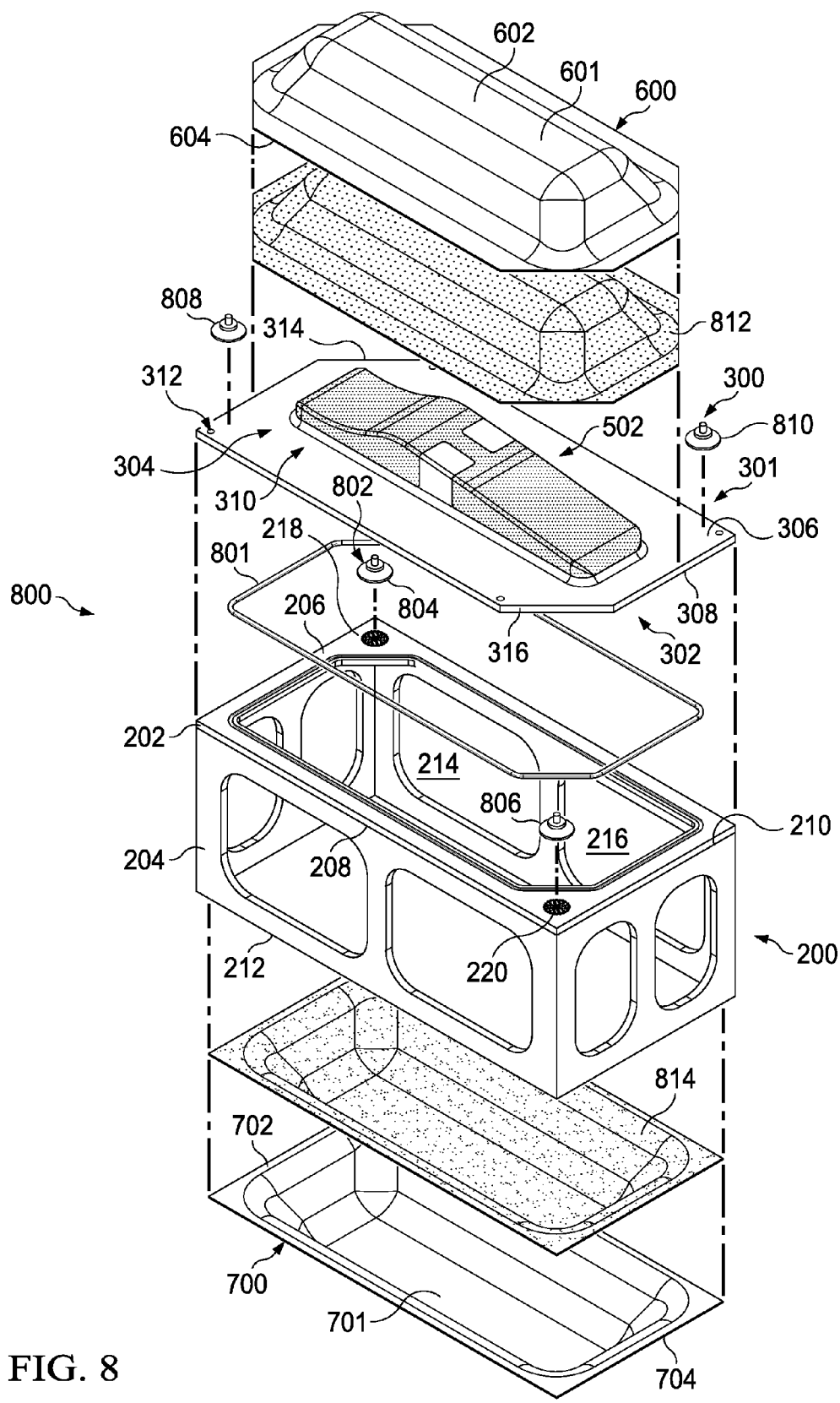
FIG. 8 is an illustration of an exploded top isometric view of a curing assembly in accordance with an illustrative embodiment.

Turning now to FIG. 8, an illustration of an exploded top isometric view of a curing assembly is depicted in accordance with an illustrative embodiment. In FIG. 8, curing assembly 800 may be formed using portable structure 200 from FIG. 2, mandrel 301 from FIGS. 3-5, thermal blanket 601 from FIG. 6, thermal bladder 701 from FIG. 7, and gasket 801.

Gasket 801 may be an example of one implementation for seal 136 in FIG. 1. Additionally, number of vacuum ports 802 may be considered part of a curing assembly 800 in this illustrative example. As depicted, number of vacuum ports 802 may include vacuum ports 804, 806, 808 and 810.

Vacuum port 804 and vacuum port 806 may be attached to vacuum attachment point 218 and vacuum attachment point 220, respectively, on first side 206 of retaining structure 202 of portable structure 200. Further, vacuum port 808 and vacuum port 810 may be attached to vacuum attachment points (not shown) on first surface 306 of mandrel 301 when curing assembly 800 is assembled.

Additionally, first breather material 812 and second breather material 814 may also be used to form curing assembly 800. First breather material 812 may be positioned between thermal blanket 601 and mandrel 301. Second breather material 814 may be positioned between thermal bladder 701 and mandrel 301. First breather material 812 and second breather material 814 may be comprised of, for example, without limitation, wool. The wool may allow air to pass through these breather materials when a vacuum is applied using number of vacuum ports 802.

Figure 9:
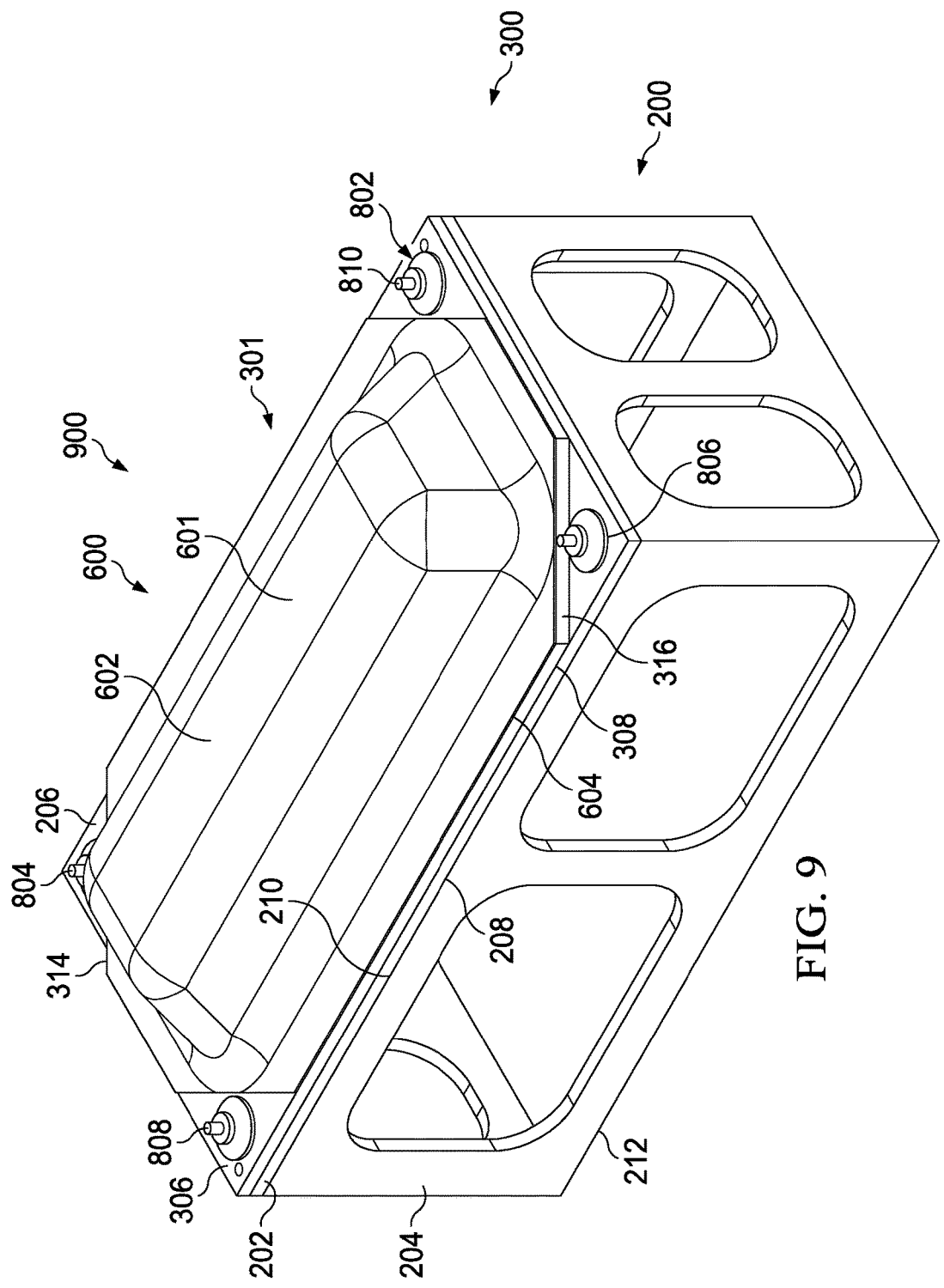
FIG. 9 is an illustration of a top isometric view of a curing assembly fully assembled in accordance with an illustrative embodiment.

With reference now to FIG. 9, an illustration of a top isometric view of curing assembly 800 from FIG. 8 fully assembled is depicted in accordance with an illustrative embodiment. As depicted, thermal blanket 601 may cover first surface 306 of mandrel 301 at first side 206 of retaining structure 202. Thermal blanket 601 and thermal bladder 701 (hidden in this view) may together form heating system 900. Heating system 900 may be an example of one implementation for heating system 122 in FIG. 1.

First breather material 812 and second breather material 814 from FIG. 8 may not be shown in this view in FIG. 9. In particular, first breather material 812 and second breather material 814 from FIG. 8 may be covered by thermal blanket 601 and thermal bladder 701, respectively.

Figure 10:
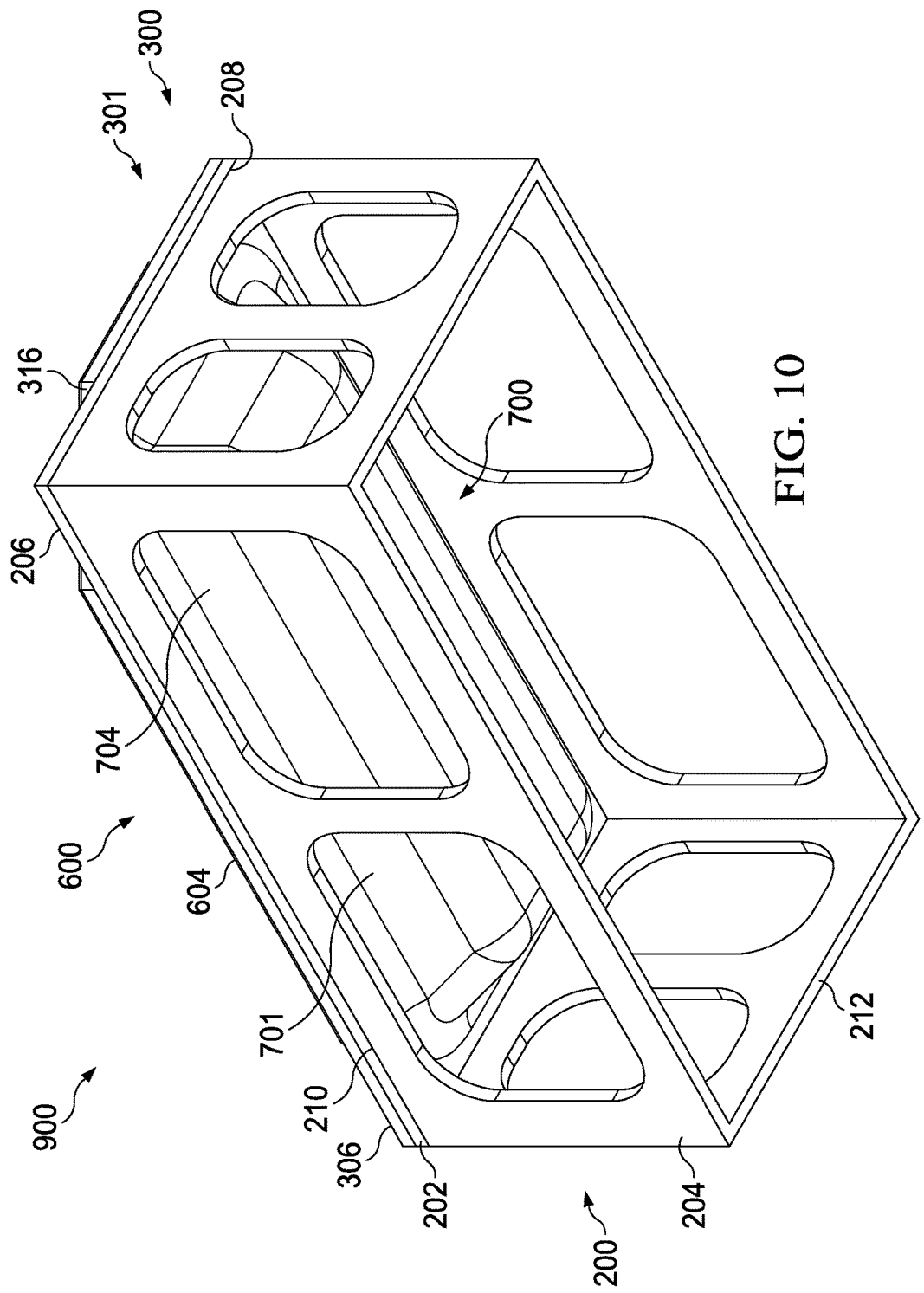
FIG. 10 is an illustration of a bottom isometric view of a curing assembly fully assembled from in accordance with an illustrative embodiment.

With reference now to FIG. 10, an illustration of a bottom isometric view of curing assembly 800 fully assembled from FIG. 9 is depicted in accordance with an illustrative embodiment. In FIG. 10, thermal bladder 701 may be more clearly seen. Thermal bladder 701 may cover second surface 308 of mandrel 301 at second side 208 of retaining structure 202.

Figure 11:
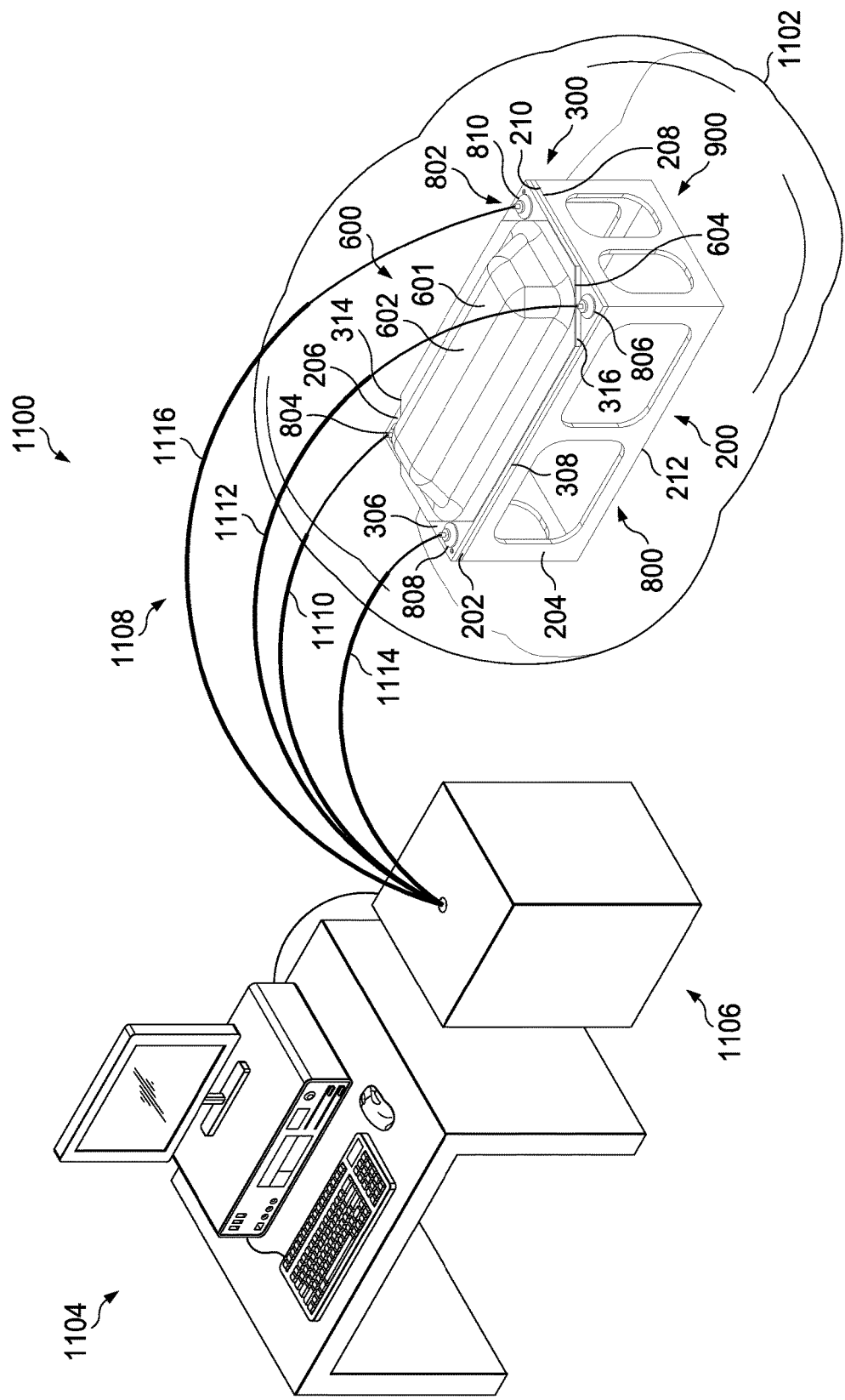
FIG. 11 is an illustration of a portable curing system in accordance with an illustrative embodiment.

With reference now to FIG. 11, an illustration of a portable curing system is depicted in accordance with an illustrative embodiment. In FIG. 11, portable curing system 1100 may include curing assembly 800 from FIG. 9 fully assembled, heating system 900, vacuum bag 1102, portable console 1104, and control system 1106.

In this illustrative example, portable console 1104 may include a vacuum system (not shown) and a power system (not shown). This vacuum system (not shown) and power system (not shown) may be implemented using vacuum system 124 and power system 128, respectively, described in FIG. 1.

Vacuum bag 1102 may be placed around curing assembly 800. Vacuum bag 1102 may substantially hermetically seal the space within vacuum bag 1102 such that a vacuum may be applied within vacuum bag 1102. This vacuum may be generated by the vacuum system (not shown) removing gas molecules from within vacuum bag 1102 through number of vacuum lines 1108 connected to number of vacuum ports 802. Number of vacuum lines 1108 may include vacuum lines 1110, 1112, 1114, and 1116 connected to vacuum ports 804, 806, 808, and 810, respectively.

Further, control system 1106 may be used to control the vacuum pressure generated by the vacuum system (not shown) within vacuum bag 1102. Control system 1106 may be also used to control the amount of heat generated by heating system 900. In this manner, the curing performed by the vacuum applied by the vacuum system and the heat provided by heating system 900 may be monitored and adjusted during the curing process as needed.

Figure 12:
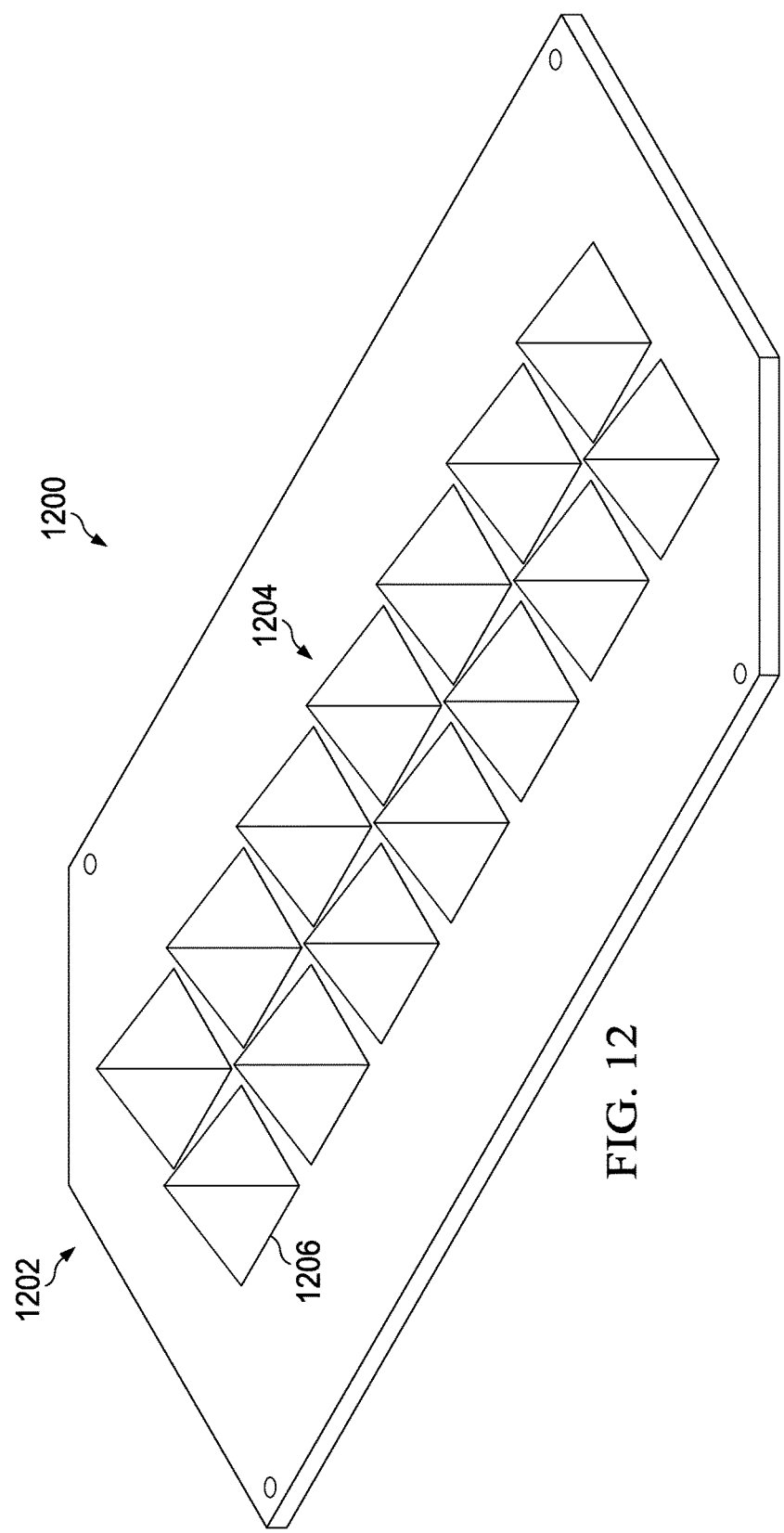
FIG. 12 is an illustration of a mandrel in accordance with an illustrative embodiment.

With reference now to FIG. 12, an illustration of a mandrel is depicted in accordance with an illustrative embodiment. Mandrel 1200 may an example of one implementation for object 115 in FIG. 1. As depicted, mandrel 1200 may have first portion 1202 and second portion 1204. Second portion 1204 may have shape 1206. Shape 1206 may be different from shape 310 of mandrel 301 in FIG. 1.

Depending on the implementation, mandrel 1200 may be used in curing assembly 800 in FIGS. 8-11 instead of mandrel 301. With mandrel 301, the part (not shown) formed by curing a composite workpiece (not shown) laid over second portion 1204 of mandrel 1200 may be different from the shape of the part (not shown) formed by curing composite workpiece 500 laid over mandrel 301 in FIG. 5.

The illustrations of portable structure 200 in FIG. 2, mandrel 301 in FIGS. 3-5, thermal blanket 601 in FIG. 6, thermal bladder 701 in FIG. 7, curing assembly 800 in FIGS. 8-11, portable curing system 1100 in FIG. 11, and mandrel 1200, are not meant to imply physical or architectural limitations to the manner in which an illustrative embodiment may be implemented. Other components in addition to or in place of the ones illustrated may be used. Some components may be optional.

The different components shown in FIGS. 2-12 may be illustrative examples of how components shown in block form in FIG. 1 may be implemented as physical structures. Additionally, the different components shown in FIGS. 2-12 may be combined with components in FIG. 1, used with components in FIG. 1, or a combination of the two.

Figure 13B:
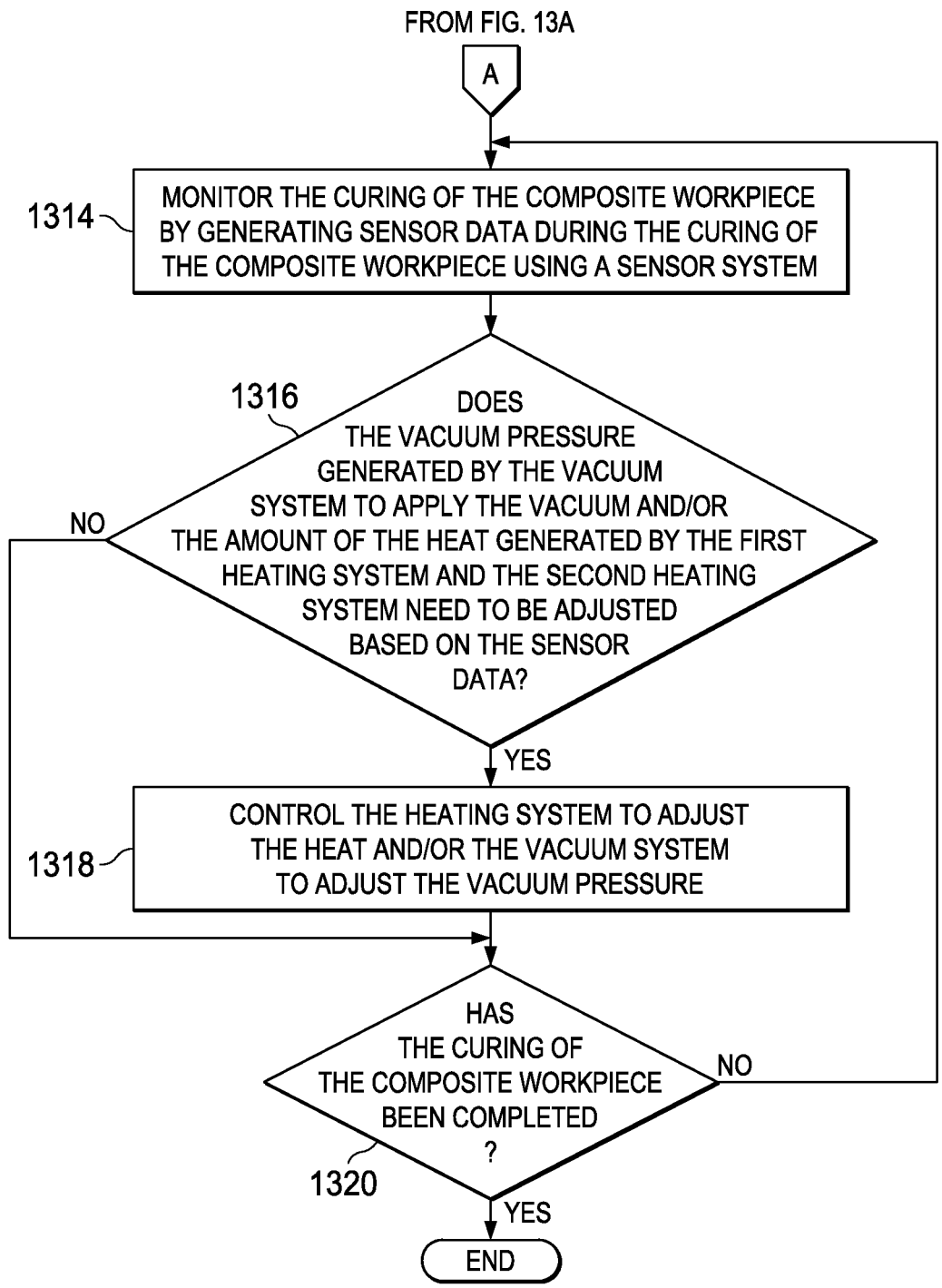
FIG. 13 is an illustration of a process for curing a composite workpiece to form a composite part in the form of a flowchart in accordance with an illustrative embodiment.

With reference now to FIG. 13, an illustration of a process for curing a composite workpiece to form a composite part in the form of a flowchart is depicted in accordance with an illustrative embodiment. The process illustrated in FIG. 13 may be implemented using portable curing system 114 in FIG. 1. Further, this process may be implemented to cure composite workpiece 108 to form composite part 172 having final shape 119 in FIG. 1.

The process may begin by placing composite workpiece 108 over object 115 having shape 116 selected for composite part 172 (operation 1300). Object 115 may be positioned relative to retaining structure 130 of portable structure 121 (operation 1302). In operation 1302, retaining structure 130 may be configured to hold object 115 within opening 134 in retaining structure 130. Retaining structure 130 may have first side 131 and second side 132.

Then, first heating device 142 may be positioned relative to retaining structure 130 such that first heating device 142 covers object 115 at first side 131 of retaining structure 130 (operation 1304). In some illustrative examples, a first breather material, such as, for example, without limitation, first breather material 812 in FIG. 8, may be positioned relative to retaining structure 130 at first side 131 of retaining structure 130 prior to first heating device 142 being positioned relative to retaining structure 130. In this manner, first heating device 142 may cover both the first breather material and object 115.

Second heating device 144 may be positioned relative to retaining structure 130 such that second heating device 144 covers object 115 at second side 132 of retaining structure 130 (operation 1306). In some illustrative examples, a second breather material, such as, for example, without limitation, second breather material 814 in FIG. 8, may be positioned relative to retaining structure 130 at second side 132 of retaining structure 130 prior to second heating device 144 being positioned relative to retaining structure 130. In this manner, second heating device 144 may cover both the second breather material and object 115.

An interface between object 115 and edge 137 of opening 134 in retaining structure 130 may be sealed using seal 136 (operation 1308). Seal 136 may substantially hermetically seal this interface in operation 1308.

Thereafter, vacuum 146 may be applied within vacuum boundary 154 around object 115 using vacuum system 124 and number of vacuum ports 148 associated with at least one of object 115 and retaining structure 130 (operation 1310). Composite workpiece 108 may be cured to form composite part 172 using at least one of heat 110 generated by first heating device 142 and second heating device 144 and vacuum 146 applied by vacuum system 124 (operation 1312).

Further, composite workpiece 108 may be monitored by generating sensor data 164 during the curing of composite workpiece 108 using sensor system 166 (operation 1314). Control system 126 may determine whether vacuum pressure 112 generated by vacuum system 124 to apply vacuum 146 and/or amount 162 of heat 110 generated by first heating device 142 and second heating device 144 need to be adjusted based on sensor data 164 (operation 1316). If vacuum pressure 112 and/or heat 110 need to be adjusted, control system 126 may control heating system 122 to adjust heat and/or vacuum system 124 to adjust vacuum pressure 112 (operation 1318).

The process may determine whether the curing of composite workpiece 108 has been completed (operation 1320). If the curing of composite workpiece 108 has been completed, the process may terminate. The result of the curing process may be composite part 172 having final shape 119.

With reference again to operation 1320, if the curing of composite workpiece 108 has not been completed, the process may return to operation 1314. With reference again to operation 1316, if vacuum pressure 112 and/or heat 110 do not need to be adjusted, the process may proceed to operation 1320 as described above.

The flowcharts and block diagrams in the different depicted embodiments may illustrate the architecture, functionality, and operation of some possible implementations of apparatus and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
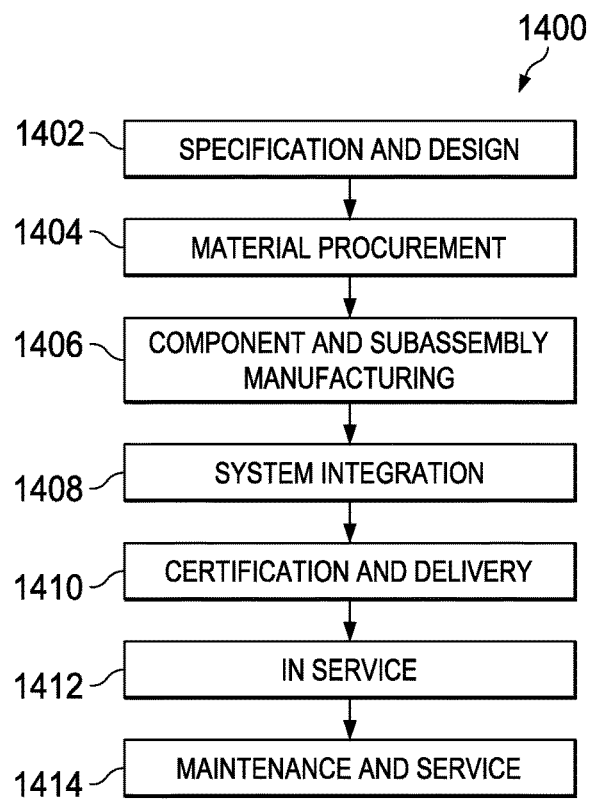
FIG. 14 is an illustration of an aircraft manufacturing and service method in the form of a block diagram in accordance with an illustrative embodiment.
Figure 15:
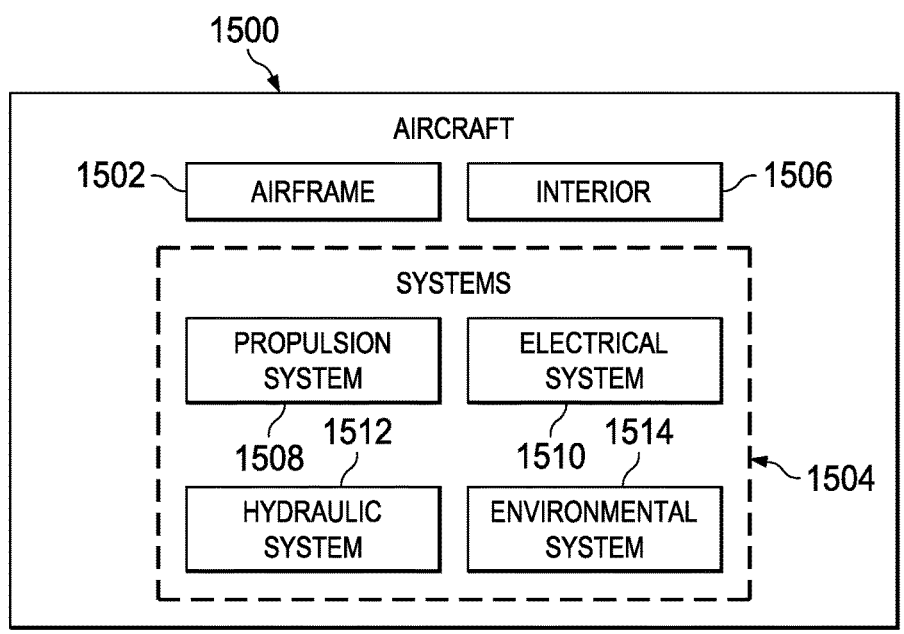
FIG. 15 is an illustration of an aircraft in the form of a block diagram in accordance with an illustrative embodiment.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method in the form of a block diagram is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 may take place. Thereafter, aircraft 1500 in FIG. 15 may go through certification and delivery 1410 in order to be placed in service 1412. While in service 1412 by a customer, aircraft 1500 in FIG. 15 may be scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft in the form of a block diagram is depicted in which an illustrative embodiment may be implemented. In this example, aircraft 1500 may be produced by aircraft manufacturing and service method 1400 in FIG. 14 and may include airframe 1502 with plurality of systems 1504 and interior 1506. Examples of systems 1504 may include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14.

For example, without limitation, portable curing system 114 may be used to cure composite materials to form parts for aircraft 1500 during one or more of component and subassembly manufacturing 1406, system integration 1408, routine maintenance and service 1414 and other stages during the processes of aircraft manufacturing and service method 1400 in FIG. 14. Further, portable curing system 114 may be configured to move to different locations during these different stages.

One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

The description of the different illustrative embodiments has been presented for purposes of illustration and description, and is not intended to be exhaustive or limited to the embodiments in the form disclosed. Many modifications and variations may be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a mandrel having a shape selected for a part;
   a support structure;
   a retaining structure supported on the support structure, the retaining structure removably supporting the mandrel, wherein the retaining structure has a first side and a second side; and
   a heating system configured to cover the mandrel at the first side of the retaining structure and the second side of the retaining structure in which the heating system is configured to generate heat for use in curing a workpiece placed over the mandrel to form the part.

2. The apparatus of claim 1, wherein the heating system comprises:
   a first heating device configured to cover the mandrel at the first side of the retaining structure; and
   a second heating device configured to cover the mandrel at the second side of the retaining structure.

3. The apparatus of claim 2, wherein at least one of the first heating device and the second heating device is comprised of a deformable material selected such that the at least one of the first heating device and the second heating device deforms to conform to the shape of the mandrel in response to a vacuum.

4. The apparatus of claim 1 further comprising:
   a first number of vacuum ports associated with the mandrel; and
   a second number of vacuum ports associated with the retaining structure.

5. The apparatus of claim 4, wherein the heating system further comprises:
   a vacuum system connected to the first number of vacuum ports and the second number of vacuum ports, vacuum system operably applying a vacuum within a vacuum boundary formed around the mandrel in which the vacuum is used in curing the workpiece placed over the mandrel to form the part.

6. The apparatus of claim 5, wherein the vacuum boundary is formed by the heating system and a vacuum bag placed around the apparatus, and wherein the heating system comprises:
   a first heating device comprised of a deformable material covering the mandrel at the first side of the retaining structure, wherein the vacuum boundary around the mandrel on the first side of the retaining structure is formed in part by the first heating device deforming to conform to the shape of the mandrel in response to the vacuum system applying the vacuum to the first number of vacuum ports associated with the mandrel; and
a second heating device comprised of a deformable material covering the mandrel at the second side of the retaining structure, wherein the vacuum boundary around the mandrel on the second side of the retaining structure is formed in part by the second heating device deforming to conform to the shape of the mandrel in response to the vacuum system applying the vacuum to the second number of vacuum ports associated with the retaining structure.

7. The apparatus of claim 5 further comprising:
a control system configured to control vacuum pressure generated by the vacuum system to apply the vacuum and an amount of the heat generated by the heating system.

8. The apparatus of claim 7 further comprising:
a power system configured to supply power to at least one of the heating system, the vacuum system, and the control system.

9. The apparatus of claim 1, wherein the retaining structure comprises an opening configured to receive and hold the mandrel and further comprising:
a seal configured to seal an interface between the mandrel and an edge of the opening of the retaining structure.

10. The apparatus of claim 1 further comprising:
a sensor system associated with at least one of the mandrel and the heating system, wherein the sensor system is configured to generate sensor data during curing of the workpiece.

11. The apparatus of claim 1, wherein the workpiece is a composite workpiece and the part is a composite part and wherein the composite workpiece is cured to form the composite part having a final shape that substantially matches at least a portion of the shape of the mandrel.

12. A portable curing system comprising:
a mandrel having a shape selected for a composite part;
a portable structure comprising a retaining structure configured to hold the mandrel in which the retaining structure has a first side, a second side, and an opening configured to receive the mandrel;
a heating system configured to cover the mandrel at the first side of the retaining structure and the second side of the retaining structure and configured to generate heat for use in curing a workpiece placed over the mandrel to form the part in which the heating system comprises:

a first heating device configured to cover the mandrel at the first side of the retaining structure; and
a second heating device configured to cover the mandrel at the second side of the retaining structure in which at least one of the first heating device and the second heating device is comprised of a deformable material selected such that the at least one of the first heating device and the second heating device deforms to conform to the shape of the mandrel in response to a vacuum;
a number of vacuum ports associated with at least one of the mandrel and the retaining structure;
a vacuum system connected to the number of vacuum ports and configured to apply the vacuum within a vacuum boundary formed around the mandrel by at least one of the heating system and a vacuum bag in which the vacuum is used to cure the workpiece placed over the mandrel to form the part;
a seal configured to seal an interface between the mandrel and an edge of the opening of the retaining structure;
a sensor system configured to generate sensor data during curing of the workpiece;
a control system configured to control vacuum pressure generated by the vacuum system to apply the vacuum and an amount of the heat generated by the heating system based on the sensor data generated by the sensor system; and
a power system configured to supply power to at least one of the heating system, the vacuum system, and the control system.

13. An apparatus comprising:
a mandrel having a shape selected for a part;
a retaining structure removably supporting the mandrel, wherein the retaining structure has a first side and a second side; and
a heating system configured to cover the mandrel at the first side of the retaining structure and the second side of the retaining structure in which the heating system is configured to generate heat for use in curing a workpiece placed over the mandrel to form the part, wherein the heating system comprises:
a first heating device configured to cover the mandrel at the first side of the retaining structure; and
a second heating device configured to cover the mandrel at the second side of the retaining structure.

* * * * *